US006652869B2

(12) United States Patent

Suazon et al.

(10) Patent No.: US 6,652,869 B2
(45) Date of Patent: *Nov. 25, 2003

(54) FOR DISH WASHING APPLICATION

(75) Inventors: Lamberta Suazon, Ajax (CA); Dawne Barry, Stouffville (CA); John Fletcher, Oakville (CA); Karen Wisniewski, Bound Brook, NJ (US); Barbara Thomas, Princeton, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,994

(22) Filed: Nov. 13, 2001

(65) Prior Publication Data

US 2003/0100462 A1 May 29, 2003

(51) Int. Cl.[7] .............................................. A01N 25/34

(52) U.S. Cl. ...................... 424/402; 510/424; 510/427; 428/221

(58) Field of Search ................................ 424/400, 402; 510/424, 427; 428/221

(56) References Cited

U.S. PATENT DOCUMENTS

| | | | | | |
|---|---|---|---|---|---|
| 4,316,824 | A | * | 2/1982 | Pancheri | 510/423 |
| 4,725,489 | A | * | 2/1988 | Jones et al. | 442/121 |
| 5,141,803 | A | * | 8/1992 | Pregozen | 442/123 |
| 6,340,663 | B1 | * | 1/2002 | Deleo et al. | 510/438 |
| 6,440,925 | B1 | * | 8/2002 | Suazon et al. | 510/438 |

* cited by examiner

*Primary Examiner*—Thurman K. Page
*Assistant Examiner*—Konata M George
(74) *Attorney, Agent, or Firm*—Richard E. Nanfeldt

(57) ABSTRACT

A cleaning wipe comprising a water insoluable substrate, wherein the substrate is a nonwoven fabric which is impregnated with a cleaning composition.

8 Claims, No Drawings

FOR DISH WASHING APPLICATION

FIELD OF THE INVENTION

The present invention relates to a disposable single use dish cleaning wipe which is substantially dry to the touch. The product comprises of an insoluable single or multilayer substrate which has been impregnated with a cleaning composition. Use of the substrate enhances foaming, cleaning and grease removal for cleaning dishware, flatware, pots and pans.

BACKGROUND OF THE INVENTION

The patent literature describes numerous wipes for both body cleaning and cleaning of hard surfaces but none describe wipes for cleaning dishware, flatware, pots and pans. U.S. Pat. Nos. 5,980,931, 6,063,397 and 6,074,655 teach a substantially dry disposable personal cleansing product useful for both cleansing and conditioning the skin and hair. U.S. Pat. No. 6,060,149 teaches a disposable wiping article having a substrate comprising multiple layers.

U.S. Pat. Nos. 5,756,612; 5,763,332; 5,908,707; 5,914,177; 5,980,922 and 6,168,852 teach cleaning compositions which are inverse emulsions.

U.S. Pat. Nos. 6,183,315 and 6,183,763 teach cleaning compositions containing a proton donating agent and having an acidic pH. U.S. Pat. Nos. 5,863,663; 5,952,043; 6,063,746 and 6,121,165 teaches cleaning compositions which are oil in water emulsions.

SUMMARY OF THE INVENTION

A substantially dry single use cleaning wipe for dishwashing application comprises a water insoluable substrate, impregnated with a cleaning composition containing an anionic sulfonate surfactant, a sulfate surfactant, a polyethylene glycol and at least one nonionic surfactant, wherein the liquid cleaning composition does not contain more than 10 wt. %, more preferably 7.0 wt. % of water and the composition is not an emulsion and does not contain proteins, enzymes, amides, sodium hypochlorite, dimethicone, a proton donating agent, N-methyl-2-pyrrolidone, monoalkyl phosphate or silicone based sulfosuccinate.

The present invention also relates to the method of manufacturing a disposable, single use cleaning wipe for cleaning dishware, flatware, pots and pans.

The present invention furthermore relates to the method for cleaning dishware, flatware, pots and pans with the cleaning wipe product described herein.

DETAILED DESCRIPTION OF THE INVENTION

The present invention relates to a cleaning wipe for cleaning dishware, flatware, pots and pans which comprises approximately:

(a) 20 wt. % to 95 wt. % of a water insoluable substrate; and (b) 5 wt. % to 80 wt. % of a cleaning composition being impregnated in said water insoluable substrate, wherein said cleaning composition comprises:

- (i) 20 to 60 wt. % of at least one alkali metal salt of an anionic sulfonate surfactant;
- (ii) 0 to 8 wt. %, more preferably 0.5 wt. % to 6 wt. % of an alkali metal salt of an anionic sulfate or an ethoxylated alkyl ether sulfonate surfactant;
- (iii) 0 to 6 wt. %, more preferably 0.1 wt. % to 4 wt. % of a proton donating agent;
- (iv) 0 to 3 wt. %, more preferably 0.25 wt. % to 2.5 wt. % of a $C_1$–$C_4$ alkanol such as ethanol;
- (v) 30 wt. % to 65 wt. % of at least one nonionic surfactant; and
- (vi) 1 wt. % to 10 wt. % of a polyethylene glycol, wherein the composition contains less than 10 wt. %, more preferably less than 7 wt. % of water has a pH of about 6.0 to about 7.5, at a concentration of about 10 grams of the composition in 100 ml. of water.

Suitable water-soluble non-soap, anionic surfactants used in the instant compositions include those surface-active or detergent compounds which contain an organic hydrophobic group containing generally 8 to 26 carbon atoms and preferably 10 to 18 carbon atoms in their molecular structure and at least one water-solubilizing group selected from the group of sulfonate, sulfate and carboxylate so as to form a water-soluble detergent. Usually, the hydrophobic group will include or comprise a $C_8$–$C_{22}$ alkyl, alkyl or acyl group. Such surfactants are employed in the form of water-soluble salts and the salt-forming cation usually is selected from the group consisting of sodium, potassium, ammonium, magnesium and mono-, di- or tri-$C_2$–$C_3$ alkanolammonium, with the sodium, magnesium and ammonium cations again being preferred.

Examples of suitable sulfonated anionic surfactants are the well known higher alkyl mononuclear aromatic sulfonates such as the higher alkyl benzene sulfonates containing from 10 to 16 carbon atoms in the higher alkyl group in a straight or branched chain, $C_8$–$C_{15}$ alkyl toluene sulfonates and $C_8$–$C_{15}$ alkyl phenol sulfonates.

A preferred sulfonate is linear alkyl benzene sulfonate having a high content of 3- (or higher) phenyl isomers and a correspondingly low content (well below 50%) of 2- (or lower) phenyl isomers, that is, wherein the benzene ring is preferably attached in large part at the 3 or higher (for example, 4, 5, 6 or 7) position of the alkyl group and the content of the isomers in which the benzene ring is attached in the 2 or 1 position is correspondingly low.

Other suitable anionic surfactants are the olefin sulfonates, including long-chain alkene sulfonates, long-chain hydroxyalkane sulfonates or mixtures of alkene sulfonates and hydroxyalkane sulfonates. These olefin sulfonate detergents may be prepared in a known manner by the reaction of sulfur trioxide ($SO_3$) with long-chain olefins containing 8 to 25, preferably 12 to 21 carbon atoms and having the formula $RCH{=}CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. Preferred olefin sulfonates contain from 14 to 16 carbon atoms in the R alkyl group and are obtained by sulfonating an $\alpha$-olefin.

Other examples of suitable anionic sulfonate surfactants are the paraffin sulfonates containing 10 to 20, preferably 13 to 17, carbon atoms. Primary paraffin sulfonates are made by reacting long-chain alpha olefins and bisulfites and paraffin sulfonates having the sulfonate group distributed along the paraffin chain are shown in U.S. Pat. Nos. 2,503,280; 2,507,088; 3,260,744; 3,372,188; and German Patent 735,096.

Examples of satisfactory anionic sulfate surfactants are the $C_8$–$C_{18}$ alkyl sulfate salts and the ethoxylated $C_8$–$C_{18}$ alkyl ether sulfate salts having the formula $R(OC_2H_4)_n OSO_3M$ wherein n is 1 to 12, preferably 1 to 5, and M is a metal cation selected from the group consisting of sodium, potassium, ammonium, magnesium and mono-, di- and triethanol ammonium ions. The alkyl sulfates may be obtained by sulfating the alcohols obtained by reducing glycerides of coconut oil or tallow or mixtures thereof and neutralizing the resultant product.

On the other hand, the ethoxylated alkyl ether sulfates are obtained by sulfating the condensation product of ethylene oxide with a $C_8$—$C_8$ alkanol and neutralizing the resultant product. The alkyl sulfates may be obtained by sulfating the alcohols obtained by reducing glycerides of coconut oil or tallow or mixtures thereof and neutralizing the resultant product. The ethoxylated alkyl ether sulfates differ from one another in the number of moles of ethylene oxide reacted with one mole of alkanol. Preferred alkyl sulfates and preferred ethoxylated alkyl ether sulfates contain 10 to 16 carbon atoms in the alkyl group.

The ethoxylated $C_8$–$C_{12}$ alkylphenyl ether sulfates containing from 2 to 6 moles of ethylene oxide in the molecule also are suitable for use in the inventive compositions. These surfactants can be prepared by reacting an alkyl phenol with 2 to 6 moles of ethylene oxide and sulfating and neutralizing the resultant ethoxylated alkylphenol.

Other suitable anionic surfactants are the $C_9$–$C_{15}$ alkyl ether polyethenoxyl carboxylates having the structural formula $R(OC_2H_4)_nOX$ COOH wherein n is a number from 4 to 12, preferably 5 to 10 and X is selected from the group consisting of $CH_2$, $(C(O)R_1$ and

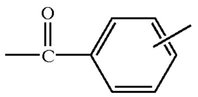

wherein $R_1$ is a $C_1$–$C_3$ alkylene group. Preferred compounds include $C_9$–$C_{11}$ alkyl ether polyethenoxy (7–9) C(O) $CH_2CH_2COOH$, $C_{13}$–$C_{15}$ alkyl ether polyethenoxy (7–9)

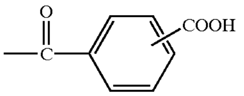

and $C_{10}$–$C_{12}$ alkyl ether polyethenoxy (5–7) CH2COOH. These compounds may be prepared by condensing ethylene oxide with appropriate alkanol and reacting this reaction product with chloracetic acid to make the ether carboxylic acids as shown in U.S. Pat. No. 3,741,911 or with succinic anhydride or phthalic anhydride. Obviously, these anionic surfactants will be present either in acid form or salt form depending upon the pH of the final composition, with salt forming cation being the same as for the other anionic surfactants.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

Preferred nonionic surfactants are the Neodol ethoxylates (Shell Co.) or Biosoft ethoxylates (Stephan) such as Biosoft 690 or Biosoft N23-6.5. These are higher aliphatic, primary alcohol containing about 9–15 carbon atoms, such as $C_9$–$C_{11}$ alkanol condensed with 7 to 10 moles of ethylene oxide (Neodol 91-8), $C_{12\text{-}13}$ alkanol condensed with 6.5 moles ethylene oxide (Neodol 23-6.5), $C_{12\text{-}15}$ alkanol condensed with 12 moles ethylene oxide (Neodol 25-12), $C_{14\text{-}15}$ alkanol condensed with 13 moles ethylene oxide (Neodol 45-13), and the like. Such ethoxamers have an HLB (hydrophobic lipophilic balance) value of about 8 to 15 and give good O/W emulsification, whereas ethoxamers with HLB values below 8 contain less than 5 ethyleneoxide groups and tend to be poor emulsifiers and poor detergents.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic detergents include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described shampoo. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

The polyethylene glycol is depicted by the formula:

$$HO—(CH_2—CH_2O)_2—H$$

wherein n is about 8 to about 225, more preferably about 10 to about 100,000, wherein one preferred polyethylene glycerol is PEG1000 which is a polyethylene glycol having a molecular weight of about 1000.

Polyethylene glycol which is used in the instant composition has a molecular weight of 200 to 1,000 wherein the polyethylene glycol has the structure $$HO(CH_2CH_2O)_nH$$

wherein n is 4 to 52. The concentration of the polyethylene glycol in the instant composition is 0.1% to 7 wt. %, more preferably 0.1 wt. % to 5 wt. %.

The proton donating agent is selected from the group consisting of inorganic acids such as sulfuric acid and hydrochloric acid and hydroxy containing organic acid, preferably a hydroxy aliphatic acid, which are selected from the group consisting of lactic acid or citric acid, orthohydroxy benzoic acid or citric acid or glycolic and mixtures thereof.

The composition also preferably contains about 0.01 to about 1.5 wt. % of a perfume, more preferably about 0.1 to about 1.0 wt. %.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc.

The cleaning composition of this invention may, if desired, also contain other components either to provide additional effect or to make the product more attractive to the consumer. The following are mentioned by way of example: Antibacterial agents such as 2,4,4'-trichloro-2'hydroxydiphenyl ether colors or dyes in amounts up to 0.5% by weight; preservatives or antioxidizing agents, such as formalin, 5-bromo-5-nitro-dioxan-1,3; 5-chloro-2-methyl-4-isothaliazolin-3-one, 2,6-di-tert.butyl-p-cresol, etc., in amounts up to 2% by weight; and pH adjusting agents, such as sulfuric acid or sodium hydroxide, as needed.

The product of the present invention comprises a water insoluable substrate with one or more layers. Each layer may have different textures and abrasiveness. Differing textures can result from the use of different combinations of materials or from the use of different manufacturing processes or a combination thereof. A dual texture substrate can be made to provide the advantage of a more abrasive side for cleaning difficult to remove soils. A softer side can be used for fine dishware and flatware. The substrate should not dissolve or break apart in water. It is the vehicle for delivering the cleaning composition to dishware, flatware, pots and pans. Use of the substrate enhances lathering, cleaning and grease removal.

A wide variety of materials can be used as the substrate. It should have sufficient wet strength, abrasivity, loft and porosity. Examples include, non woven substrates, wovens substrates, hydroentangled substrates and sponges.

Examples of suitable non woven water insoluable substrates include, 100% cellulose Wadding Grade 1804 from Little Rapids Corporation, 100% polypropylene needlepunch material NB 701-2.8-W/R from American Nonwovens Corporation, a blend of cellulosic and synthetic fibres-Hydraspun 8579 from Ahlstrom Fibre Composites, and &0% Viscose/30% PES Code 9881 from PGI Nonwovens Polymer Corp.

The product of the present invention comprising mutliple layers may be ultrasonically bonded after applying the coating of one or more of the layers. Alternatively layers may be bonded together by needlepunch, thermal bonding, chemical bonding, or sonic bonding prior to applying the coating.

The cleaning compositions are prepared by mixing at 50° C. to 65° C. The cleaning composition is impregnated onto the substrate by spraying, dipping, extrusion coating or slot coating. It can be impregnated into the wipe in an even coating across the surface of the wipe, or in a random or definite pattern, such as stripes.

The product of the present invention is substantially dry and is intended to be wetted with water prior to use. The product is wetted by immersing in water or placing under a stream of water. Foam is generated from the product by mechanical action prior to or during contact with dishware, flatware, or pots and pans. Use of the product provides enhanced soil and grease removal.

The following examples illustrate liquid cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

EXAMPLE 1

The following compositions and resultant wipes were made according to the aforementioned procedure.

| Part I | A | B | C |
|---|---|---|---|
| NaLAS | 27 | 27 | 50 |
| Ammonium ethoxylated alkyl ether sulfate | 0 | 2.3 | 2.3 |
| C12–15 alcohol ethoxylate EO7:1 | 9.9 | 19.8 | 9.9 |
| PEG6000 | 8 | 4 | 4 |
| C12–13 alcohol ethoxylate EO6.5:1 | 50 | 38 | 23 |
| Perfume | 1 | 1 | 1 |
| Ethanol | 0 | 0.7 | 0.7 |
| Water | 4.1 | 7.2 | 7.8 |
| pH 10% solution | 6.5 | 6.5 | 6.5 |
| Part I (formula A, B or C) | 3 | 1 | |
| NB-701-2.8 W/R | | 1 | |
| Wadding Grade 1804 | 1 | | |
| SRF # 8265C | 1 | | |
| SRF 1262 | 1 | | |

While particular embodiments of the invention and the best mode contemplated by the inventors for carrying out the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed:

1. A disposable single use dish cleaning wipe which is substantially dry to the touch comprises approximately:

(a) 20 wt. % to 95 wt. % of water insoluble substrate; and (b) 5 wt. % to 80 wt. % of a cleaning composition being impregnated in said water insoluble substrate, wherein said liquid cleaning composition comprises:

(i) 20 wt. % to 60 wt. % of an anionic sulfonated surfactant;

(ii) 0 to 8 wt. % of a sulfate surfactant;

(iii) 30 wt. % to 65 wt. % of an ethoxylated nonionic surfactant; and (iv) 1 wt. % to 10 wt. % of polyethylene glycol, wherein the composition contains less than 10 wt. % of water.

2. The wipe according to claim 1, wherein said sulfonate surfactant is a linear $C_{10}$–$C_{16}$ alkyl benzene sulfonate.

3. The wipe according to claim 1, wherein said sulfate surfactant is an ethoxylated $C_8$–$C_{18}$ alkyl ether sulfate.

4. The wipe according to claim 1, wherein said polyethylene glycol has a molecular weight of about 5,000 to about 7,000.

5. The wipe according to claim 1, wherein said nonionic surfactant is an ethoxylated $C_{12}$–$C_{13}$ fatty alcohol and or an ethoxylated $C_{12}$–$C_{15}$ fatty alcohol.

6. The wipe according to claim 1, further including about 0.01 to about 1.5 wt % of a perfume.

7. The wipe according to claim 1 wherein said water insoluble substrate comprises one or more materials selected from non woven substrates, woven substrates, hydroentangled substrates and sponges.

8. A method of manufacturing a product according to claim 1 wherein the cleaning composition is added or impregnated into the water insoluble substrate by spraying, dipping, extrusion coating or slot coating.

* * * * *